Jan. 9, 1962 R. L. HADDEN 3,016,268
CONVERTIBLE TRAILER
Filed April 20, 1959 2 Sheets-Sheet 1

INVENTOR
ROBERT LEE HADDEN
BY
ATTORNEY

Jan. 9, 1962  R. L. HADDEN  3,016,268
CONVERTIBLE TRAILER
Filed April 20, 1959  2 Sheets-Sheet 2
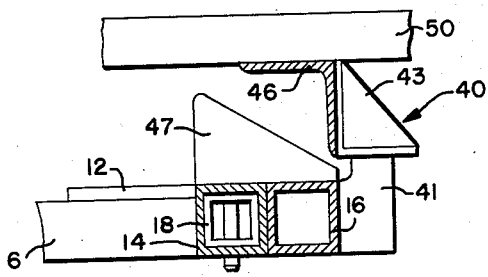
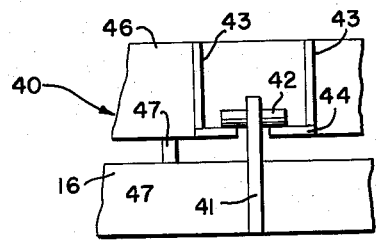
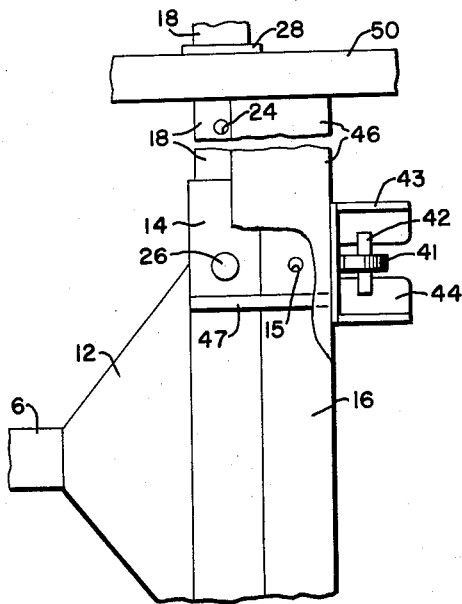
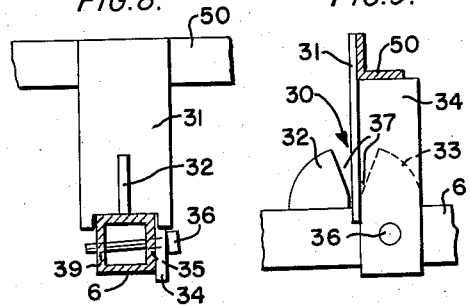
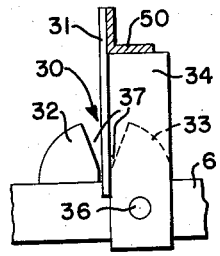
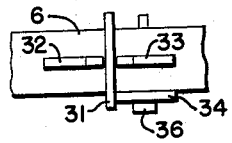
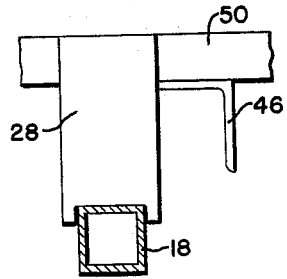
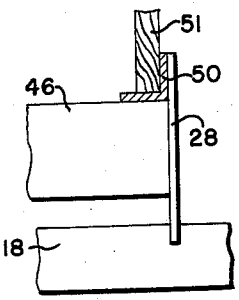
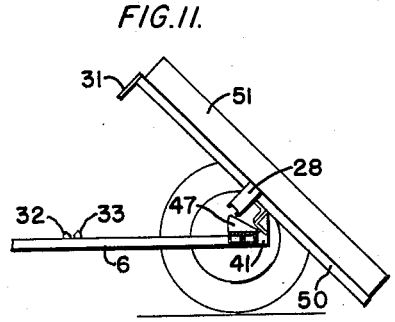
INVENTOR
ROBERT LEE HADDEN
BY
ATTORNEY

United States Patent Office 3,016,268
Patented Jan. 9, 1962

3,016,268
CONVERTIBLE TRAILER
Robert Lee Hadden, 8950 Atlantic Blvd.,
Jacksonville, Fla.
Filed Apr. 20, 1959, Ser. No. 807,700
6 Claims. (Cl. 298—17)

This invention relates generally to trailers and more particularly to a trailer which is convertible into several modes of operation.

The invention as shown is designed to be adaptable to tractors of the walking type wherein the two wheel tractor is guided by a person walking behind said tractor as it moves along. The walking type tractor is very advantageous for certain types of work in that it is less expensive than the four wheel type tractor and yet capable of doing many of the jobs required by the self driven tractor type implement. Most of the working attachments for the walking type tractor are mounted on the front thereof such as mower or tiller or mulcher or any of the well known attachments. Various accessory attachments have been made for attachment to the rear of the tractor including riding sulkys, hauling carts and the like. However, each of these latter attachments are separate and complete units and must be purchased separately and stored separately each being adaptable to only one particular job.

Accordingly, it is an object of this invention to provide a trailer type device which is convertible and adjustable in order to be adaptable for various types of working requirements.

It is a further object of this invention to provide a convertible trailer attachment which is simple in its adjustment means and quickly convertible from one operation to another.

It is a still further object of this invention to provide a convertible trailer which is economical to manufacture due to the elimination of any complicated working parts.

It is yet another object of this invention to provide a convertible trailer which is adaptable for use with any type of vehicle.

Other objects of this invention will become apparent from the following description when taken in conjunction with the accompanying drawings in which:

FIGS. 5-7 are detailed views of the trailer guide lock mechanism;

FIGS. 8-10 are detailed views of the hinge lock for the trailer mechanism;

FIG. 11 is a showing of the dump bed principle of the trailer and;

FIGS. 12 and 13 are detail showings of the physical support for the trailer.

Figure 1:
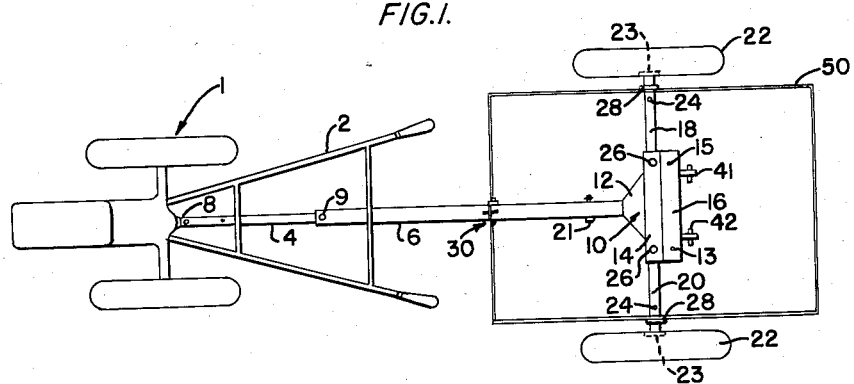
FIG. 1 is a plan view of the basic structure of the invention.

Referring now more particularly to the drawings, wherein like parts are given like reference numerals in the various figures, the walking tractor is designated at 1 with only basic showings since such a walking tractor has no part of the present invention. The basic structure of the present invention comprises the tongue which is made up of parts 4 and 6, the axle housing apparatus 10, the axles 18 and 20 and wheels 22. The guide bars 2 are part of the walking type tractor. The tongue itself is adjustable in that part 4 fits within part 6 and telescopes therein and may be adjusted at any desired length for attachment to the walking type tractor or other vehicle with which this trailer may be used. A standard type bracket is welded to the tractor and a pin is passed through tongue 4 and through the bracket, as shown at 8 in FIG. 1, in any well known manner. The only requirement for this attachment is that there be very little vertical play in the attachment. As can be seen the tongue is movable horizontally about the pin 8. Both of the elements 4 and 6 of the tongue have holes drilled vertically therethrough, the number of holes and their placement determining the number of varied lengths which the tongue may assume. For purposes of description the drawings have shown the tongue in two positions, the first being the extended position of FIGS. 1 and 2 and the second being the closed position of FIGS. 3 and 4. As can be seen from the drawings, the holes of elements 4 and 6 are aligned at the desired position and a pin 9 is passed vertically therethrough, thus locking the tongue in that position. In the drawings, tongues 4 and 6 are shown as square tubes. However, it is to be understood that round tubing could also be used.

Figure 4:
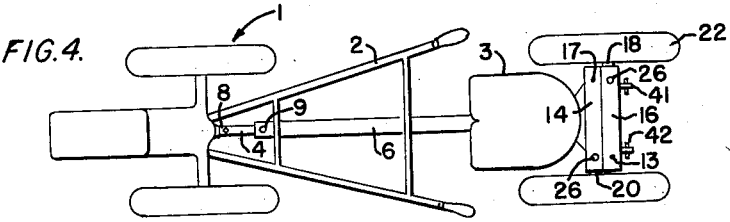
FIG. 4 is a plan view of FIG. 3.

Tongue 6 is welded to the axle housing assembly 10 as shown in FIG. 1. The axle housing assembly comprises two axle housings 14 and 16 which are welded together in order to form a solid base structure. The purpose of having the two separate housings 14 and 16 is to provide a means whereby the distance between the two wheels 22 may be varied for different purposes. FIG. 1 shows the wheels 22 in a position having the widest tread whereas FIG. 4 shows the wheels in a position having the narrowest tread. The axle tubes and the axle housing tubes are shown as square metal tubing but it is to be understood that this is in no way limiting since round tubing could also be used. As can be seen from the figures, axle tubes 18 and 20 have smaller dimensions than do the axle housing tubes 14 and 16 and the dimensions are such that the axle tube may pass into the axle housing tubes as shown. Two holes 13 and 15 are drilled vertically through the axle housing 16. Similarly, two holes are drilled vertically in housing 14. Two holes 24 are drilled in each axle 18 and 20 at substantially the extreme ends thereof. When the wide tread trailer is desired the axles 18 and 20 are placed within the axle housing 14 at opposite ends thereof and the holes farthest from the wheels 22 of each of the axles is lined up with the holes in axle housing 14 and pins 26 are placed vertically through the axle housing and the axle. When the narrow gauge tractor is desired axle 18 is placed in axle housing 16 and axle 20 is placed in axle housing 14, the hole 24 nearest the wheel 22 of each axle is aligned with the respective holes in each axle housing as shown in FIG. 4 and pins 26 are passed vertically through the axle housing and the axle. The axles 18 and 20 are mounted on the wheel bearing boxes 23 in the usual manner. It is to be understood that telescoping axles similar to tongue pieces 4 and 6 could be used instead of two axle housings as shown.

Figure 3:
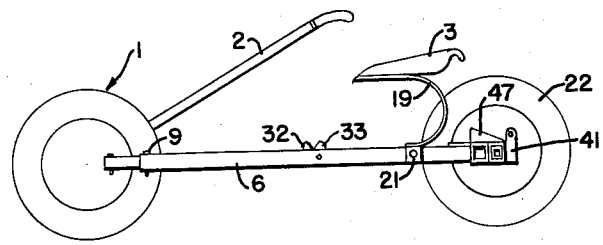
FIG. 3 is a side view of the trailer structure used as a sulky.

Thus it can be seen that the basic structure so far described has two variable adjustable positions. The distance from the pulling vehicle is variable due to the telescopic feature of the tongue and the tread or distance between the wheels is variable due to the construction of the axle housing assembly. The advantages of these two adjustable features become obvious when viewing the drawings as shown. When the invention is to be used as a sulky for a walking type tractor as shown in FIGS. 3 and 4 it is necessary that the seat 3 be placed as nearly as possible above the axles of the rear two wheels and still enable the operator to reach the steering bar 2. At the same time the rear wheel tread should be the same as the tread between the front wheels in order that the side clearance of the tractor and sulky will be the same. The seat 3 is mounted on tongue 6 in the manner shown. A spring steel member 19 attached to seat 3 terminates in a metal saddle 21 having a hole therethrough. The saddle 21 fits over tongue 6 and the hole is aligned with the horizontal hole through tongue 6 and a pin is passed therethrough.

When the invention is desired to be used as a trailer, the tongue must be of greater length in order to accommodate a carrying body of a practical size without interfering with the steering bar 2. Further, practicality dictates that the body be wider than the distance which exists between the wheels when the invention is used as a sulky. Additionally, in order that the trailer has maximum stability it is preferable that the wheels extend beyond the sides of the trailer body. These two requirements are met by the present invention due to the adjustability of the wheel gauge and the telescopic tongue. A detailed description of the structural elements used in mounting the removable body upon the trailer will now be described.

These structural elements are an integral part of the invention inasmuch as they provide structural strength and stability to the trailer as an entire operable unit. As will be seen, the absence of any of the support members will reduce the structural strength of the unit.

Figure 2:
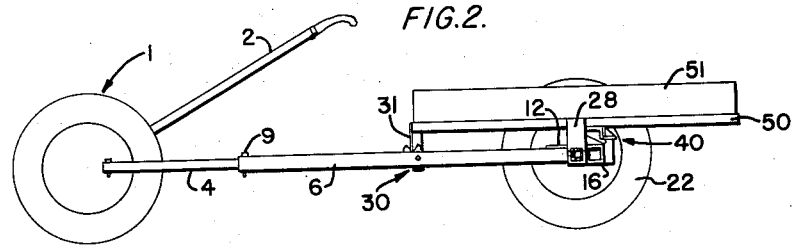
FIG. 2 is a side view of the invention with the trailer bed mounted thereon.

When the trailer is in locked and carrying position there are five lock and/or support points as can be seen from FIGS. 1 and 2. In order to clarify the following description, specific terminology will be applied to these points. The locking structure 30 at the front of the trailer shall hereafter be referred to as the guide lock structure, the two hinge devices 40 which are mounted on the axle housings shall hereafter be referred to as hinges and the two supporting structures 28 which are mounted on the trailer body shall hereafter be referred to as side supports. All of these elements serve together to lock the trailer body in place upon the basic frame structure.

Reference will now be made to FIGS. 5, 6 and 7 wherein the detail structure of hinges 40 is shown.

As can be seen from FIGS. 5 and 6 the details of said hinges are shown for only one hinge. However, both hinges 40 are exactly alike and therefore the details shown apply to both hinges. An upright structural member 41 is welded to axle housing 16 and extends above said axle housing. The upper part of member 41 has a rod 42 passing therethrough and welded to member 41 in the position shown in FIGS. 5 and 6. A vertical guide member 47 is welded on top of axle housings 14 and 16, the purpose of which will be later described. A portion of the body frame is indicated at 50. An L beam 46 extends transverse to the body 50 and is welded thereto. An L shaped member having triangular structural strength members 43 at either end is welded to beam 46, said member having two horizontal extensions 44 having a space therebetween. As can be seen from the drawing, vertical member 41 passes between the horizontal members 44 and rod 42 bears against members 44. The means for maintaining rod 42 in contacting relationship with horizontal members 44 will become apparent as the description of the various supports proceeds.

Referring now to guide lock 30 it will be seen that FIGS. 8, 9 and 10 present a detailed showing of said guide lock. Vertical guide elements 32 and 33 are mounted on tongue 6 and have a spacing 37 therebetween. It will be noted that spacing 37 increases gradually in an upward direction so that space 37 is somewhat triangular in shape. Slightly offset holes 35 and 39 are drilled in opposite sides of tongue 6. A section of the front part of body frame 50 is shown in FIGS. 8 and 9. Welded to the forward portion of said body frame is a flat metal member 31. Also welded to the body frame behind member 31 and perpendicular thereto is another flat metal member 34. Member 31 is aligned between members 32 and 33 and passes into space 37 and rests on tongue 6. Member 31 also has depending portions on either side thereof which extend downwardly along the side of tongue 6 to prevent relative movement between tongue 6 and member 31. Member 34 has a hole drilled therethrough which is in matching relationship with hole 35 of tongue 6 when the body frame 50 is in place. A bolt or pin 36 passes through the hole in member 34, and through holes 35 and 39 of tongue 6. The offset relation of holes 35 and 39 of tongue 6 obviates the necessity of using a nut for securing bolt 36 in position since this offset creates a binding action between members 31, 34 and 6 which maintains bolt 36 in position until it is manually removed. As will be described herein, as the trailer body is mounted on the frame, pin 36 secures the assembly as shown in FIG. 8. It is noted that although pin 36 does not necessarily require a fastening nut, a quick change safety pin or an equivalent thereof may be used if desired.

Side supporting members 28, the details of which are shown in FIGS. 12 and 13 will now be discussed. Side support member 28 is welded to the body frame 50 and to the L beam 46 along the outer side of the body. This side support member 28 extends downwardly and rests upon axles 18, 20 when the bed portion of the trailer is in a horizontal position.

The outer portions of members 28 have subtending portions which extend below the axle top and along the sides thereof to prevent forward and backward slipping motion between member 28 and axles 18 and 20. The length of the side support 28 between the top of axles 18 and 20 and the bottom of body frame 50 is slightly greater than the distance between axle housings 14 and 16 and the bottom of body frame 50. Thus, the main portion of the weight of the trailer and its load is supported by the side supports, which accordingly places the weight as closely as possible over the wheels themselves. The increased length of supports 28 also provides the upward thrust on the hinge members 44, maintaining horizontal members 44 in a position such that they bear upwardly against rod 42 when the trailer is in its horizontally secured position. It should therefore be noted that the thrust created by this action coupled with the thrust created by the action of supports 28 and hinge member 44 cooperate to tighten the entire trailer on the frame.

The method of mounting the removable trailer body upon the basic trailer structure will now be explained in order to show the cooperative relationship between all the parts hereinabove discussed.

The most convenient position for the trailer when it is ready to be mounted is in the approximate angular position shown in FIG. 11. Referring now to FIG. 5 L beam 46 is dropped upon the sloping edge of guide plates 47. With the trailer body tilted at an angle as in FIG. 11, the guide plates will guide the trailer body downwardly until members 44 pass under rod 42 of the hinge member 40. The trailer is then tilted forward until side supports 28 rest upon axles 18 and 20. At the same time member 31 will pass between guides 32 and 33 as shown in FIG. 9 and vertical member 34 will align itself with hole 35 of tongue 6. Bolt 36 is then placed through member 34 and tongue 6 and the trailer is now in operative position. In order to remove the trailer the steps are simply reversed. It should be noted here that the side panels 51 of the trailer which are bolted to the frame 50 lend additional structural strength to the over-all trailer apparatus when assembled. The side panels 51 are made of wood in the present showing but are not necessarily limited to that material since metal sides could also be used.

It will be noted that the very nature of the operation of the trailer as shown provides a loading or dumping operation simply by removing pin 36 and tilting the trailer upwardly from the front part about the hinge member 42 into the position shown in FIG. 11.

The present invention provides an economical, simple and efficient convertible trailer which may be used as a sulky behind a two wheel walking tractor or as a trailer behind any type vehicle.

While I have illustrated and described a preferred embodiment of my invention, it is to be understood that various modifications and changes may be made without departing from the spirit and scope of my invention and I desire to be limited only by the scope of the appended claims.

I claim:

1. In a convertible trailer having a tongue adjustable in length and an axle adjustable in length and a removable bed, apparatus for supporting said bed upon said trailer comprising first means depending from opposite sides of said bed and resting upon said axle, second means depending from the forward end of said bed and resting upon said tongue for supporting the forward end of said bed and means depending centrally from said bed and engaging locking means on said trailer whereby said bed is supported on said trailer and locked in place.

2. In a convertible trailer having an axle, an adjustable tongue and an adjustable wheel tread, apparatus for mounting a removable bed on said trailer comprising, hinge means mounted on said trailer for guiding and supporting said bed, means depending from said bed for engaging said hinge means, means mounted on said trailer for guiding said depending means into engagement with said hinge means, support means depending from the sides of said bed, and resting on the axle of said trailer for supporting said bed, and locking means depending from the front of said bed for locking said bed in a horizontal position, said locking means being secured to said tongue so that said hinge means, said support means and said locking means provide a solid mounting for said bed on said trailer.

3. The apparatus of claim 2 wherein said locking means comprises a first flat member depending centrally from the front of said bed, a second flat member depending from said bed perpendicularly to said first member, guide means mounted on said tongue for guiding said first member into contact with said tongue and a rod passing angularly through said tongue and said second member.

4. The apparatus of claim 2 wherein said hinge means comprises a horizontal member mounted on said trailer and said hinge engaging means comprises an angle member having a vertical plate secured to said bed and horizontal members extending from said plate, said members contacting the underside of said horizontal member.

5. In a trailer having a removable dump bed, guide-lock mechanism comprising a first flat member depending centrally from the front of said bed, a second flat member depending from said bed perpendicularly and adjacent to said first member, said second member being offset from the center of said bed, guide means mounted on the tongue of said trailer for guiding said first member into contact with said tongue when said bed is placed on said trailer and a rod passing angularly through said tongue and said second member.

6. In a convertible trailer, a chassis comprising, a hollow tongue member, a first elongated housing secured to one end of said tongue perpendicular thereto, a second elongated housing secured to said first housing parallel thereto, a first axle within one of said housings at one end thereof, a second axle within one of said housings at the other end thereof, means for securing said axles at a plurality of positions within said housings, wheels rotatably secured to the free ends of said axles, a plurality of guide members mounted on said housings, a plurality of cross members secured to and extending from said housings; a removable dump body, a beam depending from said dump body for riding on said guide members when said body is being mounted on said chassis, said beam gripping said cross members when said dump body is in its horizontal carrying position, a plate depending from each side of said body and contacting said axles for supporting said body on said axles when said body is in its horizontal carrying position, a support member depending from the front of said body, means for securing said support member to said tongue when said body is in its horizontal carrying position; a member slidable within said tongue, means for securing said slidable member at differing positions within said tongue and means on the free end of said slidable member for attaching said member to a draft means.

References Cited in the file of this patent

UNITED STATES PATENTS

| 2,174,063 | Richards | Sept. 26, 1939 |
| 2,374,383 | Sampsell | Apr. 24, 1945 |
| 2,451,698 | Swinehart | Oct. 19, 1948 |
| 2,662,776 | Hurst | Dec. 15, 1953 |
| 2,686,692 | Hunter et al. | Aug. 17, 1954 |
| 2,800,362 | Asperger | July 23, 1957 |
| 2,828,827 | Chouinard | Apr. 1, 1958 |
| 2,880,034 | Kamlukin | Mar. 31, 1959 |

FOREIGN PATENTS

| 645,711 | Great Britain | Nov. 8, 1950 |